J. L. MALM.
BARREL.
APPLICATION FILED MAY 26, 1914.

1,215,565.

Patented Feb. 13, 1917.
3 SHEETS—SHEET 1.

Witnesses:
A. L. Lord.
E. H. Fresch.

Inventor.
John L. Malm
by B. W. Brockett
Atty.

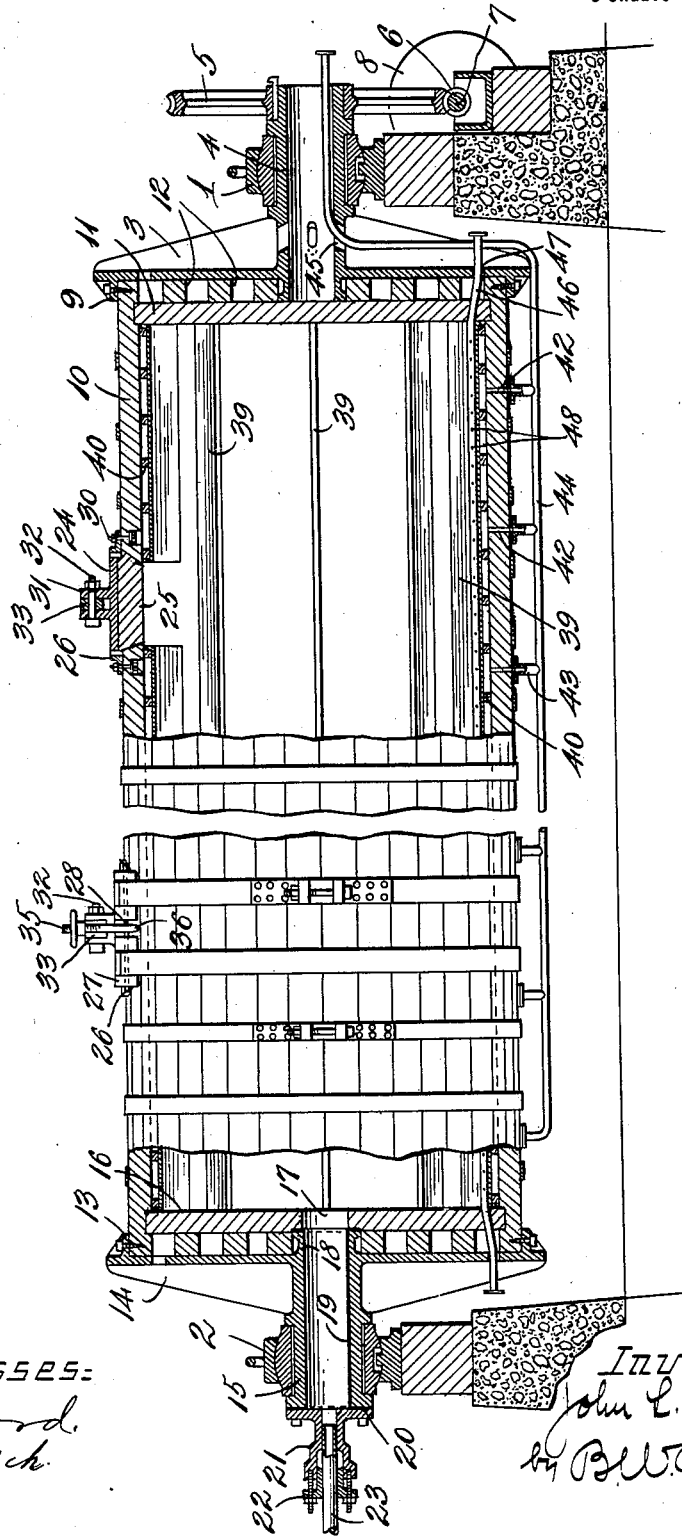

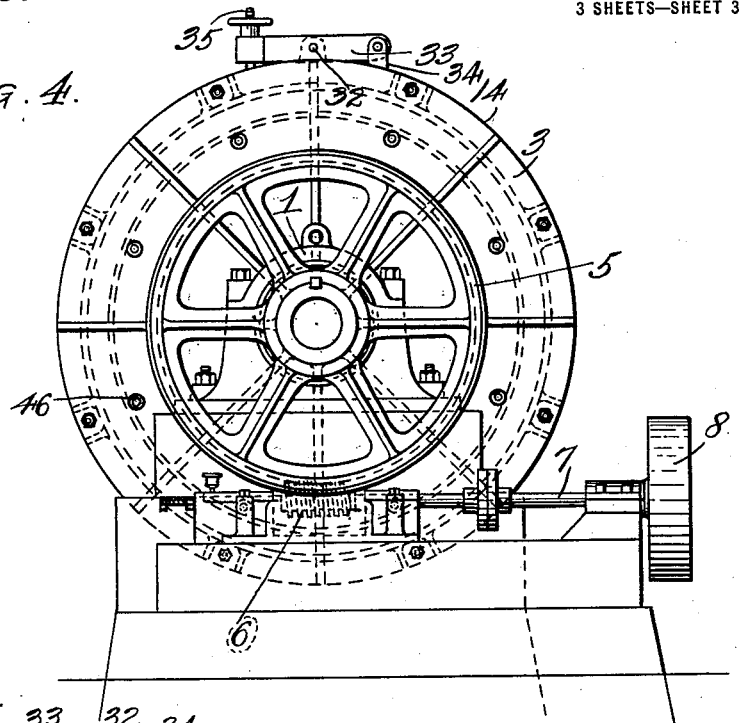
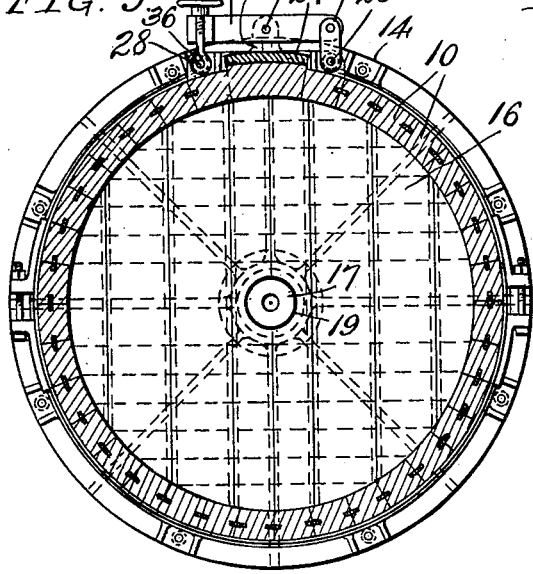
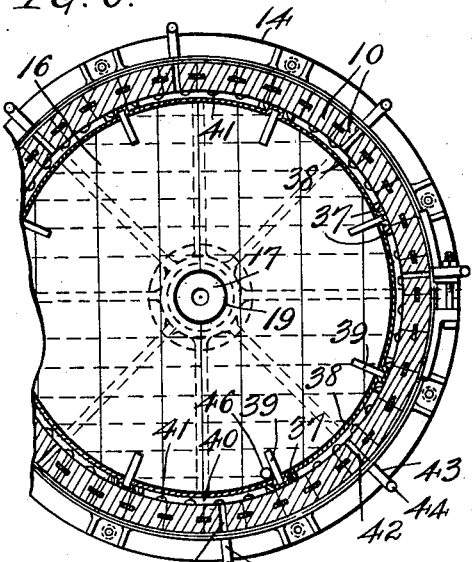

UNITED STATES PATENT OFFICE.

JOHN L. MALM, OF DENVER, COLORADO.

BARREL.

1,215,565.   Specification of Letters Patent.   Patented Feb. 13, 1917.

Application filed May 26, 1914. Serial No. 841,083.

*To all whom it may concern:*

Be it known that I, JOHN L. MALM, a citizen of the United States, residing at Denver, in the county of Denver and State of Colorado, have invented certain new and useful Improvements in Barrels, of which the following is a specification.

This invention relates to metallurgical apparatus generally, and particularly to that class of such devices utilized in filtering, agitating and treating ores.

More specifically the invention relates to a filtering and treating barrel rotatably mounted and provided on the interior with a filtering medium spaced from the inner wall of the barrel to form liquor receiving chambers or pockets provided with means on the periphery of the barrel for charging ore into the same, means at one of the trunnions for supplying pressure to the barrel, means for draining the liquor from the pockets or chambers back of the filtering medium through the opposite trunnion, means for leading air, ozone or other gaseous substances to the bottom of the batch, and suitable means for driving or rotating the barrel. Another feature of the device is the arrangement of suitable longitudinally disposed baffles for baffling and distributing the mass over the inner wall.

The invention may be further briefly summarized as consisting in the construction and combination of parts hereinafter set forth in the following description, drawings and claims.

Figure 1:
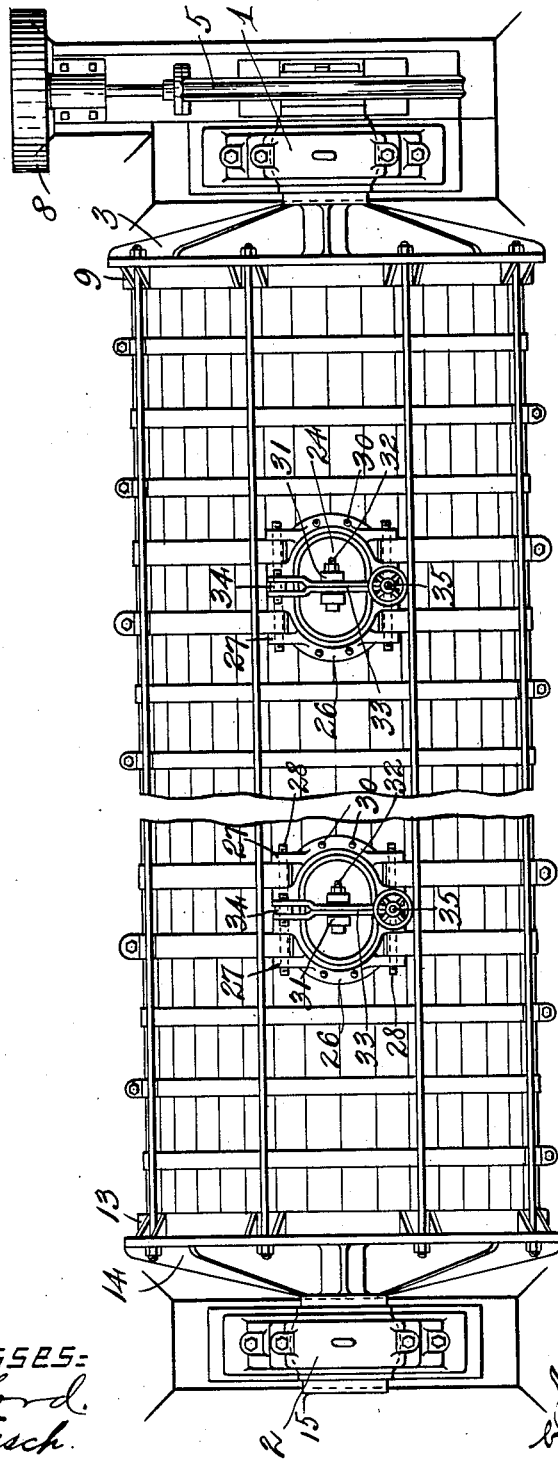
Figure 2:

Referring to the drawings, Figure 1 is a top plan view of the device; Fig. 2 is a detail view showing the arrangement of the annular supporting members for the filtering medium; Fig. 3 is a side elevation of the device; Fig. 4 is an end elevation showing the drive; Fig. 5 is a section through one of the doors with the filtering bed and associated parts removed; and Fig. 6 is a section taken at another point showing the arrangement of the filter bed and the baffles.

In carrying out the invention any preferred form and construction of parts may be employed so long as they possess the necessary characteristics, but I have shown one arrangement in the drawings which is effective in operation, and in such embodiment 1 and 2 represent suitable bearings mounted upon masonry or any other suitable support.

These bearings support the barrel structure which will now be described.

The barrel structure comprises a head 3 having a hollow trunnion 4 extending into the bearing 1 and beyond the same, and there provided with a worm gear 5 meshing with a worm 6 mounted on a driving shaft 7 and driven by any suitable driving pulley 8. The head 3 is also provided with an inwardly extending flange 9 which receives suitable staves or strips 10, preferably of wood, arranged about a lining head 11, preferably of wood. This head 11 is spaced from the cast head 3 by suitable blocks 12 and it seals the opening in the trunnion 4. At the opposite end the staves or strips 10 pass within a flange 13 carried by a cast head member 14 having a hollow trunnion 15 arranged in the bearing 2. The staves at this end in like manner engage a suitable lining head 16, preferably of wood, and provided with an opening 17 at the center in alinement with the opening of the hollow trunnion 15. The cast head 14 has an extension 18 which engages in a suitable recess in the outer wall of the lining head 16 and the cast head in the opening of the hollow trunnion 15 and the projection 18 is lined with a pure gum rubber lining 19 to protect the metal against acid, and this lining extends over the face of a flange 20 at the outer end of the trunnion. Against this flange 20 is secured an acid-proof coupling member 21 provided with a stuffing box structure 22 arranged about an inlet pipe 23. Intermediate the length of the barrel and in the same longitudinal line along the periphery are arranged suitable charging doors, two being shown in the drawings. Each of these doors comprises an outer plate 24, and an inner lining block 25, preferably of wood, secured to the door in any suitable manner. The cast door 24 engages within a cast ring 26 provided upon each side with suitable eyes 27 for receiving pins 28 passing through suitable loops in the ends of straps 29 encircling the barrel. The rings are also secured to the barrel by screws or bolts 30. Each of the cast doors 24 is provided with upwardly extending ears 31 for receiving a bolt 32 arranged in a lever 33 pivotally connected to an ear 34 at one end and connected to a tightening screw 35 provided with a hook 36 adapted to pass under the other pin 28 whereby upon the tightening of the screw the lining block 25 is forced into the opening in the barrel. The block is preferably made tapered, and the opening in the barrel is correspondingly tapered so as to permit of a tight closing of the door.

Against the inner wall of the barrel are secured longitudinally disposed strips 37 arranged in pairs, the pairs being spaced around the inner wall of the barrel, and these strips are preferably of wood and adapted to support a filter bottom made up in sections 38, the edges of each section being bent down over the blocks and held in place by baffle plates or strips 39 of wood forced in between the edges of the sections 38. In order to support the sections between the pairs of strips 37, arc-shaped supporting strips 40 are provided, and these strips are provided upon their outer periphery with notches or recesses 41 which establish communication between the chambers formed by these supporting strips and the strips 37. In order to lead the liquor or solution from the chambers or compartments formed by these strips just described, suitable openings 42 are provided through the barrel, and these openings connect with suitable short hose connections 43 preferably formed integral with a longitudinally disposed rubber discharge pipe 44 bent inward in a radial direction through an opening 45 in the trunnion 4 and out at the end of the trunnion where it may be connected to any suitable discharge. There are preferably eight baffles arranged throughout the inner circumference of the barrel and there are correspondingly eight discharge hose connections as just described.

In order to supply air, ozone or other gases to the barrel when the charging doors are upward, a pure gum rubber hose 46 is provided and it leads through an opening 47 in the head 3 through the head lining 11 along the inner surface of the filter sections 38 to the opposite end of the barrel, where it extends out through similar openings. This hose 46 is provided with a plurality of perforations 48 throughout its length and within the barrel for discharging the air or gas into the mass.

In operation the powdered ore or other material to be treated, preferably ore containing chlorids, is charged through the charging doors into the barrel so as to partially fill the same. Solution is then delivered through the pipe 23 to the barrel. The barrel is then rotated, and as the result of such operation, the material is baffled and distributed over the inner surface. When sufficient agitation has taken place in the barrel, pressure is conveyed thereto through the pipe 23 and continued rotation and pressure causes the solution to be filtered through the filtering medium into the chambers or channels under it from which it passes through the connections 43 to the pipe 44 from whence it may be delivered through the end of the trunnion to any suitable tank for collection. When sufficient filtration has taken place, pressure to the pipe 23 is relieved and wash water is delivered to the pipe 44 from whence it passes to the outside of the filter sections through the same and causes the loosening or the washing down of the cake formed within the filtering medium. This wash water may then be filtered back through the device and collected as a filtrate, since it may contain certain values which were not washed out in the original operation.

In the treating of some ores containing chlorids, it is necessary to charge air, or ozone, into the mass in order to oxidize the iron to an inert state and deliver its chlorin to other untreated ore or to other ferrous chlorids so that they in turn may affect other untreated particles of ore, and this is accomplished by connecting the pipe 46 with any suitable supply of air or ozone, the filter cake having been discharged from the filter wall or plates into the bottom of the barrel above the pipe 46, it being understood, of course, that during this operation the barrel is not rotated.

Having described my invention, I claim:—

1. In a combined treating and agitating barrel, a pair of heads, a cylindrical body arranged between said heads, suitable linings for said heads, a supply for the material leading into the barrel, a plurality of baffle supporting strips spaced around the inner wall of said body, a filtering medium extending into the groove between the baffle supporting strips of one pair and into the groove between the baffle supporting strips of the adjacent pair, baffles arranged in said grooves and engaging the edges of the filtering medium and holding the same in place, means for draining the filtrate from between the filtering medium and the inner wall of the body, and means for imparting a movement to the barrel.

2. In a combined treating and agitating barrel, a pair of heads, a cylindrical barrel body arranged between said heads, a head lining within said body adjacent to each head, one of said heads being provided with a central opening, a trunnion carried by each head, the trunnion adjacent the head lining having an opening communicating therewith, a supply pipe connected with said trunnion, a plurality of pairs of baffle supporting strips spaced around the inner wall of said body, a filtering medium extending into the groove between the baffle supporting strips of one pair and into the groove between the baffle supporting strips of the next adjacent pair, baffles arranged in said grooves and engaging the edges of the filtering medium and holding the same in place, means for draining the filtrate from between the filtering medium and the inner wall of the body, and means for agitating said barrel.

3. In a combined treating and agitating barrel, a pair of heads, a cylindrical barrel body arranged between said heads, a head lining within said body adjacent to each head, one of said heads being provided with a central opening, a trunnion carried by each head, the trunnion adjacent the head lining having an opening communicating therewith, a supply pipe connected with said trunnion, a plurality of pairs of baffle supporting strips spaced around the inner wall of said body, a filtering medium extending into the groove between the baffle supporting strips of one pair and into the groove between the baffle supporting strips of the next adjacent pair, baffles arranged in said grooves and engaging the edges of the filtering medium and holding the same in place, filtering medium supporting strips arranged between the pairs of the baffle supporting strips and spaced apart to form chambers, said strips being provided with means for establishing communication between adjacent chambers, means for draining the filtrate from said chambers, and means for agitating the barrel.

4. In a combined treating and agitating barrel, a pair of heads, a cylindrical barrel body arranged between said heads, a head lining within said body adjacent to each head, one of said heads being provided with a central opening, a trunnion carried by each head, the trunnion adjacent the head lining having an opening communicating therewith, a supply pipe connected with said trunnion, a plurality of pairs of baffle supporting strips spaced around the inner wall of said body, a filtering medium extending into the groove between the baffle supporting strips of one pair and into the groove between the baffle supporting strips of the next adjacent pair, longitudinally disposed radially extending baffle strips arranged in said grooves and engaging the edges of the filtering medium and holding the same in place, means for draining the filtrate from between the filtering medium and the inner wall of the body, and means for agitating said barrel.

5. In a barrel, a pair of supporting heads each provided with a suitable trunnion, a lining for each head, a barrel body arranged between the heads, a filter bed arranged upon the inner wall of said barrel, means for draining the filtrate from said bed, a charging door arranged in the periphery of the body portion, and means for supplying gas throughout the length of said barrel at a point opposite to the door.

6. In a barrel, a pair of supporting heads each provided with a suitable trunnion, a lining for each head, a barrel body arranged between the heads, a filter bed arranged upon the inner wall of said barrel, means for draining the filtrate from said bed, a charging door arranged in the periphery of the body portion, and a gas supply tube extending along said barrel opposite to the door.

In testimony whereof I affix my signature in presence of two witnesses.

JOHN L. MALM.

Witnesses:
J. W. T. GRAY,
B. F. WILSON.